United States Patent [19]
Liaw et al.

[11] Patent Number: 6,058,390
[45] Date of Patent: *May 2, 2000

[54] VEHICLE NAVIGATION ASSISTANCE DEVICE HAVING FAST FILE ACCESS CAPABILITY

[75] Inventors: Jeff Jyh-Min Liaw, San Jose; Toshikazu Sakakibara, Cupertino, both of Calif.

[73] Assignee: Visteon Technologies, LLC, Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/753,483

[22] Filed: Nov. 26, 1996

[51] Int. Cl.$^7$ .................................................. G06F 17/30
[52] U.S. Cl. .............................. 707/2; 707/100; 340/995
[58] Field of Search ................... 340/995, 990; 707/1–10, 205, 3, 204, 100–102; 364/443

[56] References Cited

U.S. PATENT DOCUMENTS

| | | | |
|---|---|---|---|
| 4,571,700 | 2/1986 | Emry, Jr. et al. | 707/101 |
| 4,888,698 | 12/1989 | Driessen et al. | 364/443 |
| 5,305,295 | 4/1994 | Chu | 369/30 |
| 5,307,278 | 4/1994 | Hermans et al. | 364/450 |
| 5,375,233 | 12/1994 | Kimber et al. | 707/205 |
| 5,471,393 | 11/1995 | Bolger | 364/450 |
| 5,515,283 | 5/1996 | Desai et al. | 364/443 |
| 5,560,006 | 9/1996 | Layden et al. | 707/2 |
| 5,678,046 | 10/1997 | Cahill et al. | 707/200 |
| 5,778,374 | 7/1998 | Dang et al. | 707/101 |

FOREIGN PATENT DOCUMENTS

0354645 A3  5/1989  European Pat. Off. .

OTHER PUBLICATIONS

"Microsoft Press Computer Dictionary," Microsoft Press, Second Edition, p. 241, Dec. 1994.

*Primary Examiner*—Hosain T. Alam
*Attorney, Agent, or Firm*—Blakely, Sokoloff, Taylor & Zafman LLP

[57] ABSTRACT

A method of using a DOS file system to access a file in a database is provided. In one embodiment implemented in an on-board vehicle navigation system, the file includes map data for a given geographic area. A file access table (FAT) is associated with the file system and references the file. The FAT has a plurality of locations, each location including a reference to one of the data clusters of the file and to another location in the FAT, forming a linked list of the references. The logical order in which the data clusters occur within the file is determined by following the linked list in the FAT for that file. A cluster table is then constructed for the file. The references to the data clusters are stored in consecutive locations of the cluster table according to the logical order of the data clusters within the file. The file is then accessed by sequentially accessing the consecutive locations in the cluster table to retrieve the data clusters.

18 Claims, 7 Drawing Sheets

VEHICLE NAVIGATION ASSISTANCE DEVICE HAVING FAST FILE ACCESS CAPABILITY

FIELD OF THE INVENTION

The present invention pertains to the field of computer systems. More particularly, the present invention relates to a fast file system for accessing a database in an on-board vehicle navigation system.

BACKGROUND OF THE INVENTION

An on-board navigation system can be useful for assisting a driver of an automobile in navigating through unfamiliar territory. An example of such a system is a computer-based device which allows the driver to select a destination from a stored street map database, computes a route to the selected destination, and then guides the driver to the selected destination. A system such as this generally includes various sensors for determining the position of the vehicle. As the vehicle travels, the system processes data from the sensors to determine the most likely position of the vehicle with respect to the map data. The system may display a street map of the surrounding area to the driver as the vehicle travels and an indication of the position and movement of the vehicle on the displayed map. The system may also provide audible and/or visual navigation instructions to the driver. On-board automobile navigation systems such as this are currently available from Zexel USA Corporation, located in Sunnyvale, Calif.

An on-board navigation system of this type is controlled by a computer. Like other computers, the computer in an on-board vehicle navigation system has an operating system, which is software for controlling the basic operations of the system. The operating system includes a file system for managing files, including naming, organizing, storing, and retrieving files. Several design concerns are associated with the file system in an on-board vehicle navigation system, however. These concerns generally relate to the speed, modifiability, memory usage, and market support of the file system.

For example, the original equipment manufacturer (OEM) may acquire the file system from an outside supplier. However, the use of proprietary software from an outside source may be subject to restrictions imposed by the supplier on modifying or decompiling the file system software. Such restrictions can impede debugging operations and can hinder upgrades to the overall navigation system. In addition, it may be difficult to find support tools in the marketplace for a proprietary file system. Therefore, it may be desirable to use a file system which has an open architecture (i.e., published specifications).

The well-known DOS (Disk Operating System) file system has an open architecture, which makes it an attractive prospect for use in an on-board navigation system. In addition, a DOS file system generally requires a relatively small amount of memory compared to certain proprietary file systems. However, a DOS file system tends to be slow when accessing large files, as discussed in detail below (under the heading "Detailed Description"). Yet high speed operation is particularly desirable in an on-board automobile navigation system, because data files tend to be accessed with high frequency (such as when changing scale levels or geographic area). Further, delays in accessing files can distract a driver and therefore create a hazard. Consequently, a standard DOS file system is generally not well-suited for use in an on-board vehicle navigation system.

Therefore, what is needed is a file system which provides fast data access, low memory usage, flexibility, and marketplace support. What is further needed is a fast file system which has an open architecture and which is suited for use in an on-board vehicle navigation system.

SUMMARY OF THE INVENTION

A method of enabling access to a file is provided. The file includes a number of subsets arranged in a logical order within the file. A first table includes references to the subsets. The logical order of the subsets within the file is determined from the first table. The references are arranged within the first table in an order that is different from the logical order of the subsets within the file. The references to the subsets are then stored in consecutive locations of a second table according to the logical order of the subsets within the file.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A fast DOS file system is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

The present invention includes a technique for increasing the effective data access speed of a DOS file system, as will be described below in detail. In one embodiment, the fast DOS file system is implemented in an on-board automobile navigation system. However, the present invention can also be implemented in a variety of different architectures, including architectures that are not related to an on-board vehicle navigation system. For example, the present invention can be implemented in a personal computer.

Overall System Architecture

Figure 1:
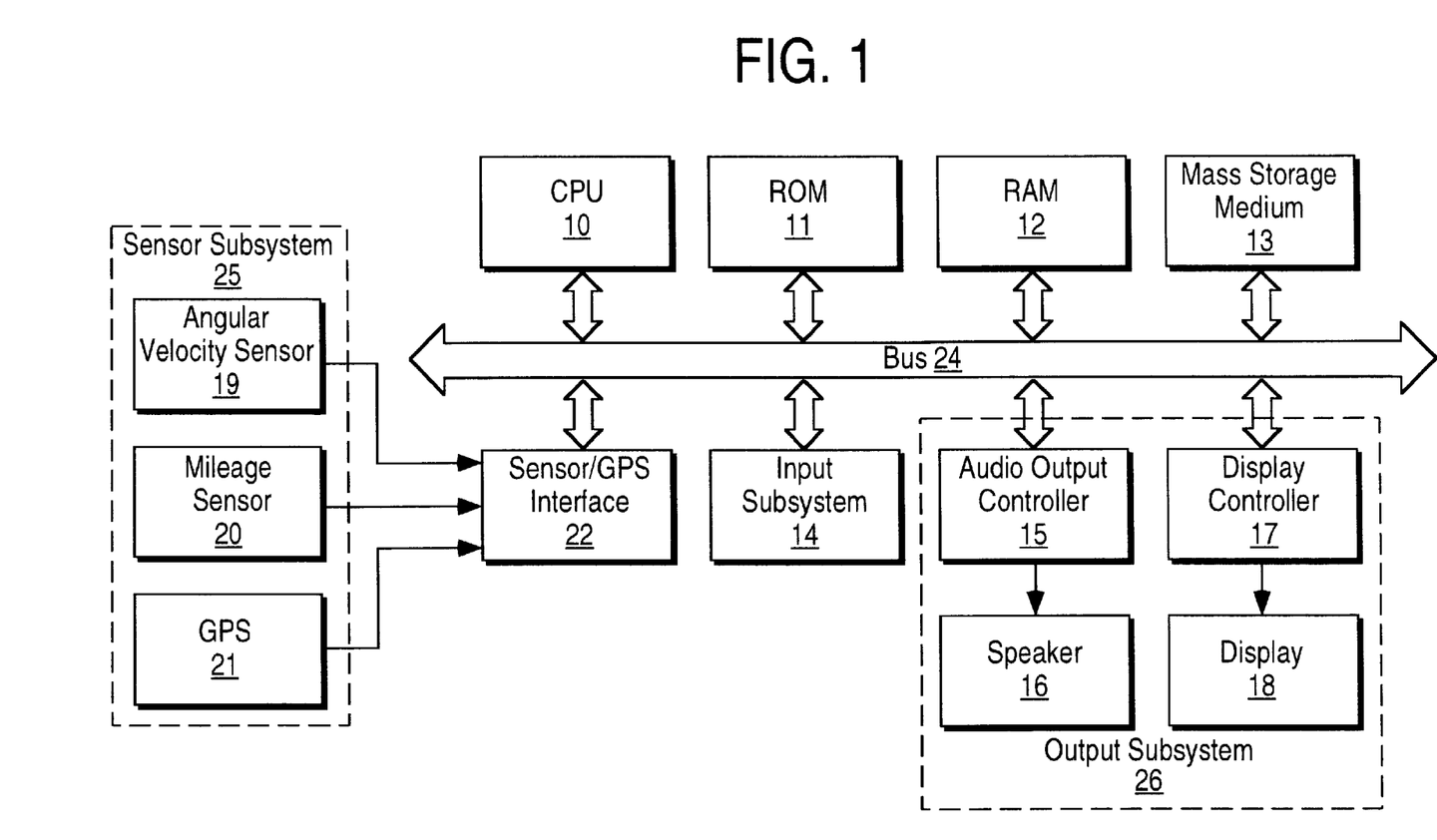
FIG. 1 is a block diagram of an on-board automobile navigation system.

FIG. 1 illustrates an on-board automobile navigation system 1 in which the present invention is implemented. The navigation system 1 includes a central processing unit (CPU) 10, read-only memory (ROM) 11, random access memory (RAM) 12, and a mass storage medium 13, all coupled to a bus 24. The bus 24 may actually comprise two or more buses coupled together by bridges and/or bus adapters. Also coupled to the bus 24 is an output subsystem 26. The output subsystem 26 includes an audio speaker 16, which receives signals from an audio output controller 15 coupled to the bus 24. The output subsystem 26 also includes a visual display device 18, which receives signals from a display controller 17 coupled to the bus 24. An input subsystem 14 is coupled to the bus 24 and provides the means for a user (e.g., a driver or passenger of the vehicle) to enter inputs into the navigation system 1. A sensor subsystem 25 is also coupled to the bus 24 via an interface device 22. The sensor subsystem 25 includes an angular velocity sensor 19, a mileage sensor (e.g., odometer) 20 and a global positioning system (GPS) receiver 21, each of which is coupled to the interface device 22. The interface device 22 formats the data received from sensors 19 and 20 and GPS receiver 21 for transmission onto the bus 24.

Various substitutions may be made for the components illustrated in FIG. 1 within the scope of the present invention. For example, mass storage medium 13 may be any suitable form of non-volatile storage device, including a magnetic or optical storage disk, e.g., a CD-ROM (Compact Disk-ROM), CD-R (CD-Recordable), DVD (Digital Versatile Disk), or the like. In one embodiment, mass storage medium 13 is a PCMCIA (Personal Computer Memory Card International Association) hard drive. Further, mass storage medium 13, ROM 11, and RAM 12 may each represent multiple physical devices. Similarly, the display device 18 may be a cathode ray tube (CRT), a liquid crystal display (LCD), or any other form of suitable visual output device. The input subsystem 14 includes, in one embodiment, mechanical buttons by which a user can enter alphanumeric information into the navigation system 1 or select information displayed on the display device 18. In other embodiments, the mechanical buttons may be replaced by pressure or thermal sensitive buttons, a touch sensitive screen, a voice-activated input system, or another suitable substitute. Further, the particular sensor subsystem 25 that is illustrated in FIG. 1 may be replaced by other forms sensing devices within the scope of the present invention. For example, the GPS receiver 21 may be replaced with an alternative form of high accuracy locating system, and the angular velocity sensor may be replaced with an absolute heading detector (e.g., a compass).

Overall System Operation

The navigation system 1 includes a database of street map data, data identifying points of interest, such as tourist attractions, restaurants, airports, shopping malls, etc., and other data. The street map data includes data representing various different scale levels and levels of detail. In one embodiment, the database is stored in mass storage medium 13. The navigation system 1 allows the driver to select a desired destination from the stored database and then computes a route to the selected destination.

The system 1 displays a street map of a given geographical area to the driver as the vehicle travels using display device 18. This display includes an indication of the current position and movement of the vehicle with respect to the displayed map. As the vehicle travels, the system 1 uses a technique called "dead-reckoning", in which data from the angular velocity sensor 19 and the mileage sensor 20 are processed to determine a change in relative position from a previously-computed position. The system 1 then uses a map-matching algorithm to compare the computed position to the map database to revise the position determination, if necessary. In certain instances, data from the GPS receiver 21 can be used to correct, supplement, or replace the position determination made using dead-reckoning and map-matching. As the vehicle travels, the system outputs navigation instructions to the user via the speaker 16 in the form of recorded or synthesized speech. In addition, the navigation instructions may be output to the user via the display device 18.

The navigation system 1 functions based on an operating system. The operating system includes a file system for performing functions such as the naming, organizing, storing, and retrieving of files. The present invention includes a technique for improving the operation of the file system, as will be described below.

In one embodiment, the present invention is carried out in the navigation system 1 in response to its CPU 10 executing sequences of instructions that are contained in memory (which may be ROM 11, RAM 12, mass storage medium 13, or a combination of these devices). That is, execution of the sequences of instructions contained in memory causes the CPU 10 to perform the steps of the present invention, which are described below. For example, the instructions may be loaded into RAM 12 for execution from a persistent store, such as ROM 11 or mass storage medium 13. In other embodiments, hard wired circuitry may be used in place of, or in combination with, software instructions to implement the present invention. Thus, the present invention is not limited to any specific combination of hardware circuitry and software, nor to any particular source for the instructions executed by the navigation system 1.

File Access Table

The present invention includes a technique for increasing the effective speed of a DOS file system. A DOS file system is generally not well-suited for use in an automobile navigation system due to its relatively slow data access speed. The reasons for this relatively slow data access speed will now be discussed.

Data is generally stored on a storage medium in the form of data clusters. A cluster represents several continuous physical sectors of the storage medium. The data clusters of each file have a logical sequence within the file. A DOS file system generally uses cluster chains to access files. A cluster chain is a linked list of the data clusters in a particular file. These cluster chains are stored in a file access table (FAT), which is an association between a file and the data clusters of that file.

Figure 2:
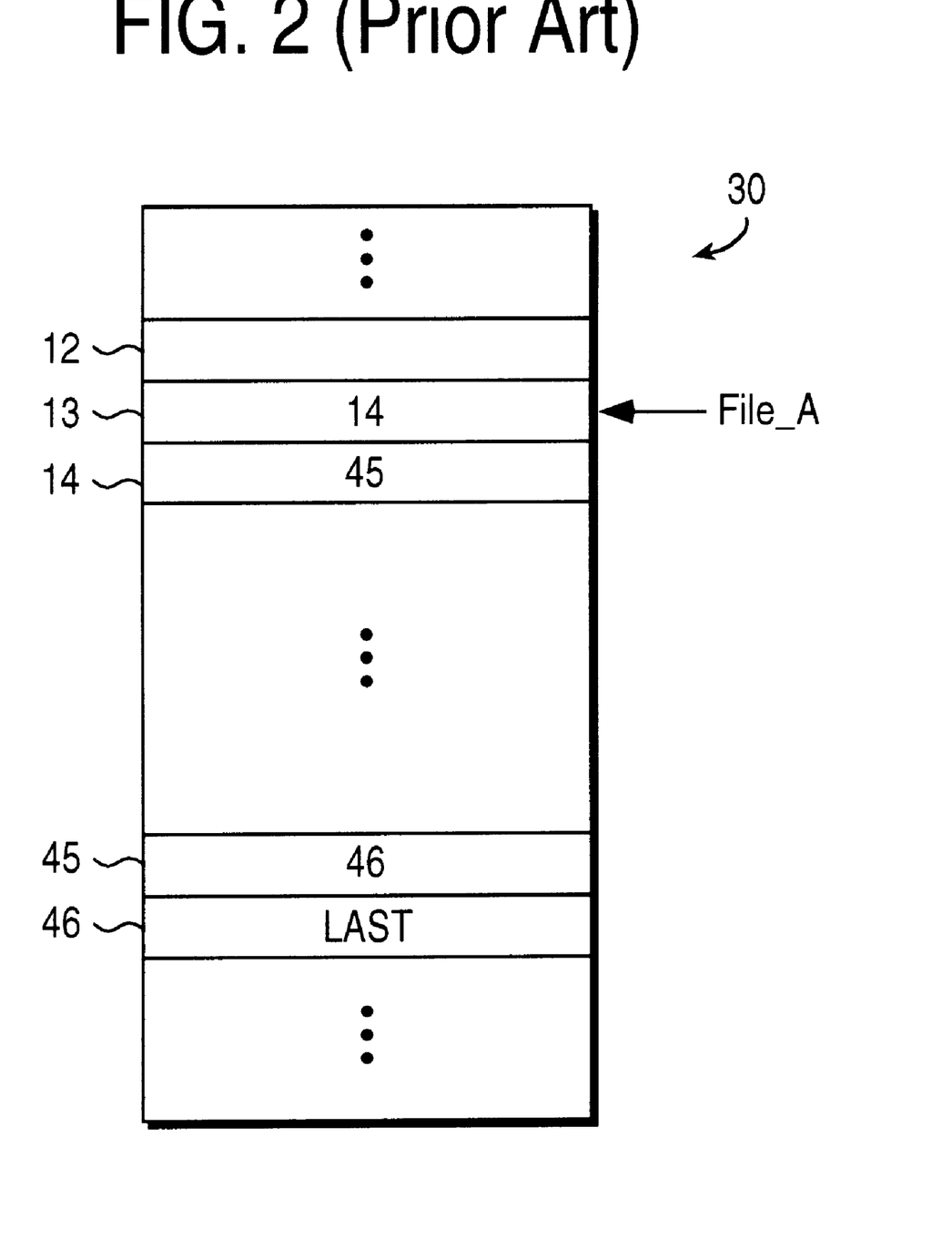
FIG. 2 illustrates a DOS file access table (FAT).

FIG. 2 illustrates a FAT 30. The FAT 30 includes a number of locations, each of which stores a reference to a particular data cluster of a file. Each reference also is a reference to the next data cluster in the logical sequence within the file. The beginning of the cluster chain for each file is indicated by an entry point, which is location 12 in FAT 30. Thus, the cluster chain for File __A is (13, 14, 45, 46). The last cluster in a file's cluster chain is indicated by an appropriate identifier stored in the last location of the cluster chain, such as the identifier "LAST" stored in location 46 of FAT 30.

A file is accessed by performing a sequential forward search through the cluster chain associated with that file in the FAT. The file pointer pointing to the currently referenced data cluster can be moved forward along the cluster chain. If the relevant data is located behind the file pointer, the file pointer can be set to the beginning of the cluster chain and the search can be re-initiated. If the file is small, the time required to perform this search may be insignificant. However, a database file generally contains a large quantity of data, such that a search of the cluster chain can take a relatively long time. Consequently, the FAT associated with a DOS file system may be suitable for accessing relatively small files with short cluster chains; however, the FAT is not very suitable for accessing large data files, such as those generally found in the database of an on-board vehicle navigation system.

Fast File Access Table

Figure 3A:
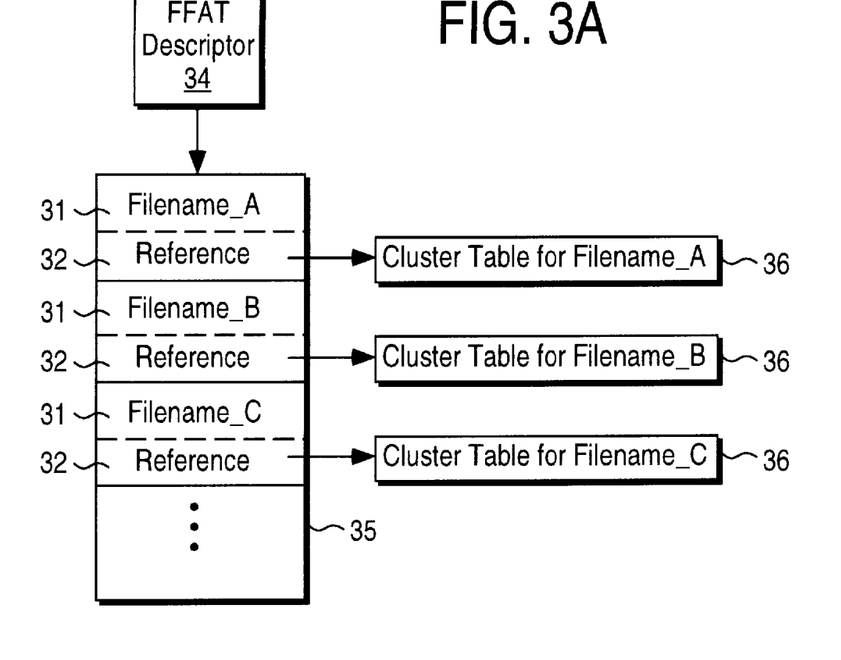
FIG. 3A illustrates a fast FAT (FFAT).

The present invention effectively increases the data access speed of a DOS file system by creating an additional structure located (functionally) "on top of" the file system's FAT. This structure is referred to herein as a "fast FAT" (FFAT). An FFAT is illustrated in FIG. 3A. In essence, the cluster chain for each file is stored in a new table, referred to herein as a "cluster table." The cluster table contains a number of locations, or logical clusters, which contain the references to the actual clusters in the file. In contrast with the standard FAT of a DOS file system, references to the clusters are stored in consecutive locations of the cluster table according to the logical sequence of the clusters within the file. As a result, a file can be accessed by a random scheme using its cluster table, rather than by a sequential scheme using the FAT. As will be described below, a cluster table for a given file is generated by traversing the FAT associated with that file.

Referring now to FIG. 3A, The FFAT consists of a descriptor 34, a reference table 35, and cluster tables 36 for several files, "Filename __A", "Filename B", and "Filename __C". The reference table 35 contains the file name of each file and a reference to the cluster table for each file. (The file names in the reference table 35 are indicated by reference numerals "31", while the references to the cluster tables are indicated by reference numerals "32".) The descriptor 34 describes the number of files in the FFAT and the size of the reference table 35. Thus, each file in the FFAT 33 has an entry in the reference table 35. The entry can be identified by the file name, and the file's cluster table can then be located by its associated reference. Thus, a cluster table for a given file can be accessed by its file name.

Figure 3B:
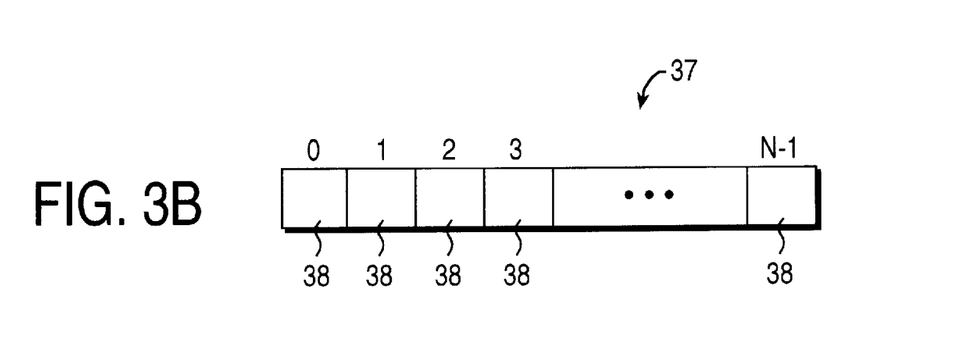
FIG. 3B illustrates a cluster table.
Figure 3C:
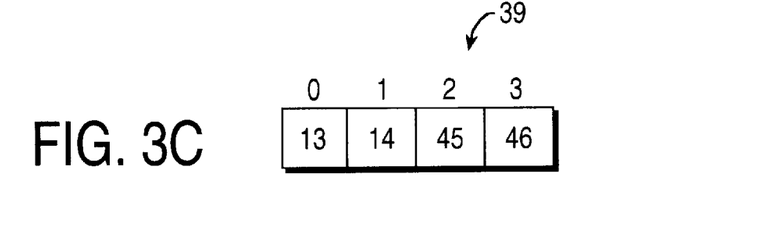
FIG. 3C illustrates a cluster table storing references to data clusters of a file.

FIG. 3B illustrates a cluster table in greater detail. Cluster table 37 includes N locations 38, which are referred to as "logical clusters". Each logical cluster 38 in the cluster table 37 is identified by an index value in the range 0, 1, 2, ..., N−1. The index value of each logical cluster represents the order in which the data cluster referenced by that logical cluster occurs in the logical sequence in the data file. For example, FIG. 3C, illustrates the cluster table 39 associated with the exemplary file, File __A, discussed in connection with FIG. 2. Recall that the cluster chain for File A was (13, 14, 45, 46). Thus, the cluster table 39 for file A contains four logical clusters, identified (indexed) as logical clusters 0,1, 2, and 3, which contain references to data clusters 13, 14, 45, and 46, respectively.

In one embodiment, the FFAT is treated as an optional feature that is used by the DOS file system only when available. In the event that an FFAT is not available, the file system simply uses the standard FAT to access a file. In this embodiment, each time the system 1 is reset, the file system will attempt to load the FFAT for a default directory. Similarly, each time a change of directory is performed, the file system will attempt to load the FFAT table for the new directory. A change in directory may be required, for example, to access data representing a different geographical area than that currently accessed. If loading of the FFAT is successful, the standard FAT table accesses for files specified in the configuration file will be replaced by FFAT accesses. If the FFAT table is not successfully loaded or the file is not specified in the configuration file, then the normal FAT accesses will be performed. Consequently, the navigation system 1 can operate without the FFAT table, albeit at a slower speed than if the FFAT table were used.

Figure 4:
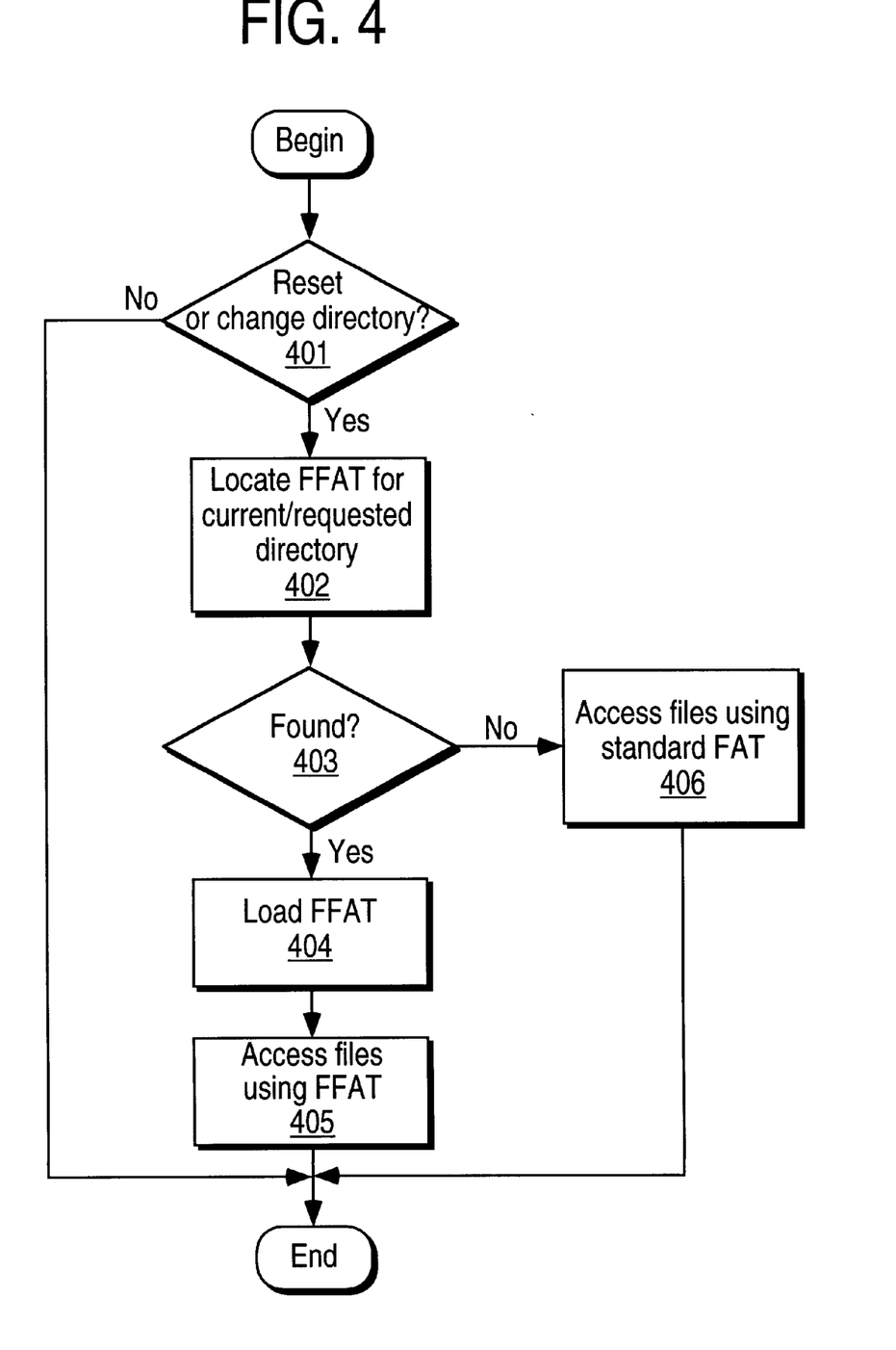
FIG. 4 is a flow diagram illustrating a routine for locating a FFAT in response to a system reset or a change of directory.

To illustrate this capability, FIG. 4 shows a routine of locating an FFAT. In response to a resetting of the navigation system 1 or upon a change of directory (step 401), the navigation system 1 attempts (step 402) to locate the FFAT for the current or requested directory. If the FFAT is found (step 403), then the system loads the appropriate FFAT (step 404). The system then accesses the appropriate file or files using the FFAT (step 405). If an FFAT was not located, the system accesses the appropriate file or files using the standard FAT (step 406).

Figure 5:
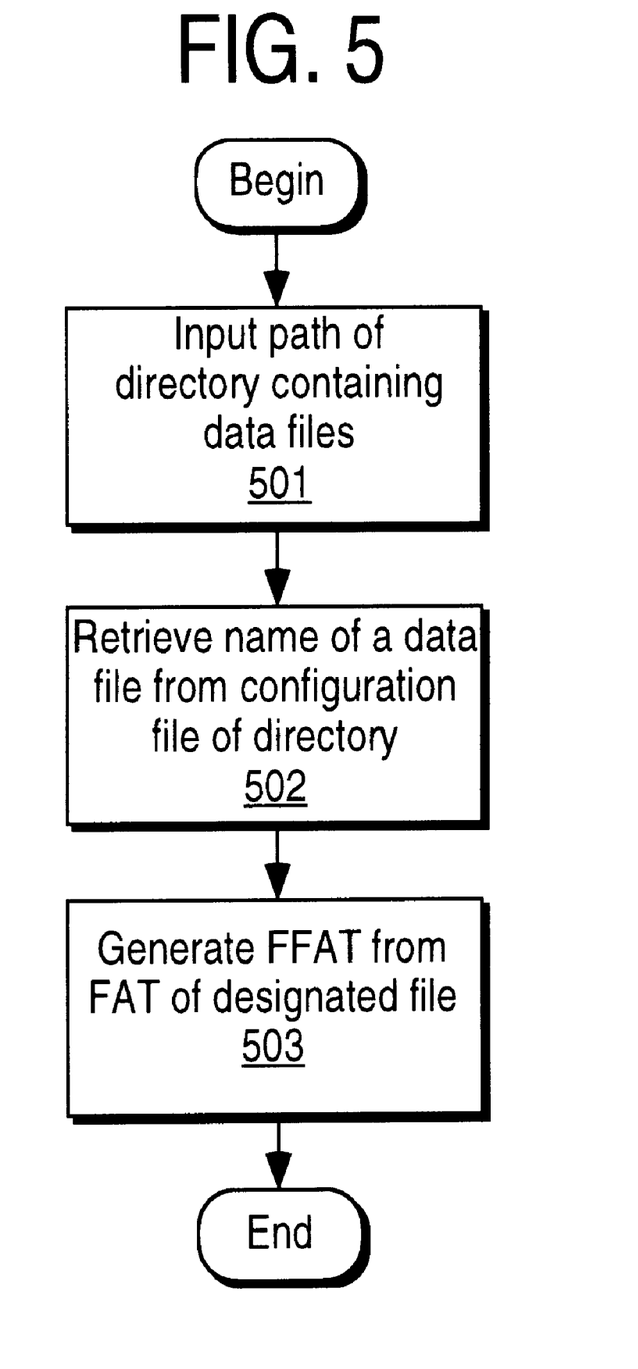
FIG. 5 is a flow diagram illustrating a routine for generating an FFAT.

Each time a data file referenced by the FFAT is updated, the FFAT must also be updated. FIG. 5 illustrates a routine for updating an FFAT. This updating procedure is performed automatically in response to the file being updated. In one embodiment, the procedure of FIG. 5 is implemented in a software utility dedicated to this purpose. Initially, a path of a directory containing data files is input (step 501). The name of a data file which has been updated is then retrieved from the configuration file of the directory (step 502). Next, an updated FFAT is generated from the FAT by traversing the cluster chain specified by the FAT (step 503). The step of updating the FFAT (step 503) includes updating the cluster table of the affected file.

Figure 6:
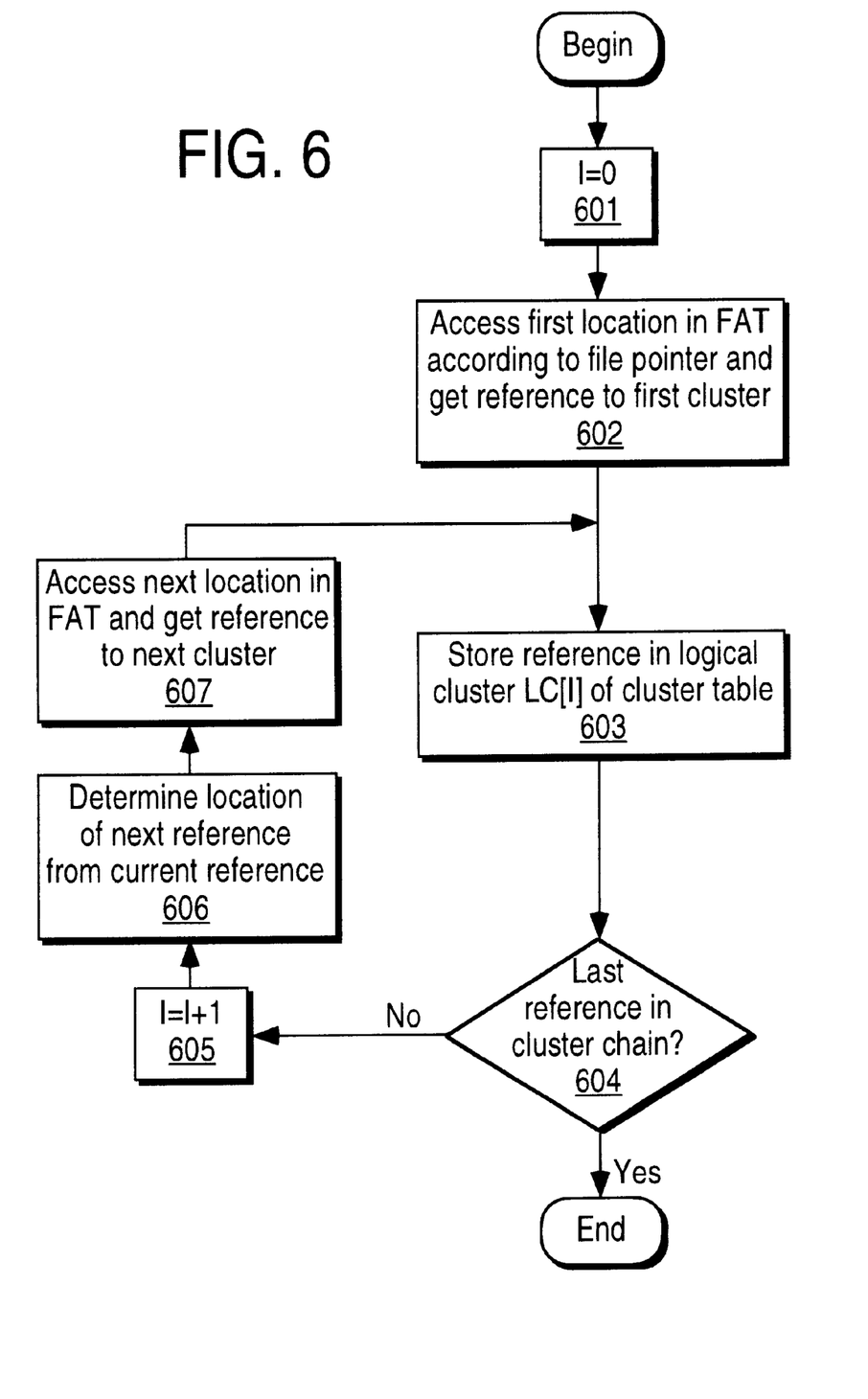
FIG. 6 is a flow diagram illustrating a routine for generating a cluster table for a file.

FIG. 6 illustrates a routine for generating or updating the cluster table of a file. With an index variable I initially set to zero (step 601), the system 1 accesses a first location in the FAT based on the file pointer and obtains the reference to the first cluster (step 602). The reference is then stored in logical cluster LC[I] (the logical cluster having an index value of I) of the cluster table. If the reference was the last cluster in the cluster chain (step 604), the routine ends. Otherwise, the index variable I is incremented by one (step 605). After incrementing the index value I, the location of the next reference in the cluster chain is determined from the current reference (step 606). The next location in the FAT is then accessed to obtain the reference to the next cluster in the cluster chain (step 607). The routine then repeats from step 603.

A data file is accessed by reading the logical clusters of the file's cluster table in order. The data access is initiated by a read request to the file system. The read request includes a file name, an offset, and a count. The offset is measured from a given point in the file, such as the beginning of the file, a current position or the end of the file. The count specifies the number of data bytes to be read. Thus, in one embodiment, a read request has the format: READ ([FILE__ NAME], [OFFSET], [COUNT]). Given the offset, the starting logical cluster of the cluster table is computed by dividing the offset by the cluster size. Thus, the starting logical cluster of the cluster table is accessed randomly, rather than sequentially. The reference to the actual data cluster can then be retrieved from the logical cluster of the cluster table. The sector number associated with the offset can be computed by multiplying the actual cluster number from the cluster table by the number of sectors per cluster. By providing the logical sector number and the number of sectors to the device driver, the logical sector can be mapped to a physical sector in order to retrieve the data from storage.

The logical clusters in the cluster table are read in order of their appearance in the cluster table. Thus, the file is accessed as a random access file, rather than as a sequential access file.

Figure 7:
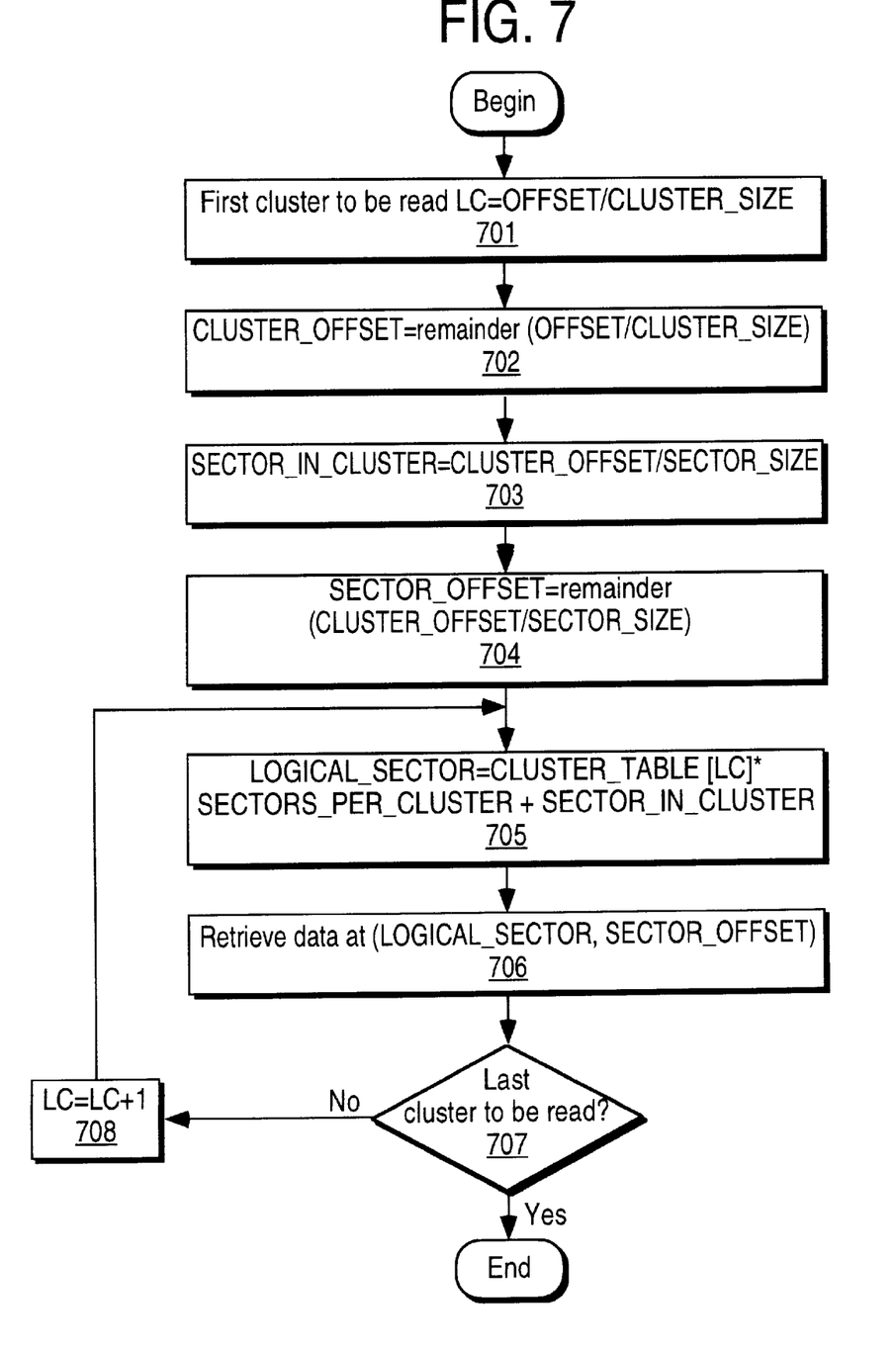
FIG. 7 is a flow diagram illustrating a routine for reading a file using an FFAT.

FIG. 7 illustrates a routine for reading data in the manner described above. Initially (in step 701), the first cluster LC to be read in the cluster table is computed by dividing the OFFSET value (in bytes) by the cluster size (in bytes). A value CLUSTER_OFFSET is then computed as the remainder of the OFFSET value divided by the cluster size (step 702). Next, a value SECTOR_IN_CLUSTER is computed as CLUSTER_OFFSET divided by the sector size (step 703). A value SECTOR_OFFSET is then computed (step 704) as the remainder of CLUSTER_OFFSET divided by the sector size. Next, the logical sector to be read LOGICAL_SECTOR is computed (step 705) according to the equation:

$$LOGICAL\_SECTOR=(CLUSTER\_TABLE[LC] * \text{number of sectors per cluster})+SECTOR\_IN\_CLUSTER$$

where CLUSTER_TABLE[LC] represents the data cluster referenced by logical cluster LC of the cluster table. Next, the data to be read is located using the computed LOGICAL_SECTOR and SECTOR_OFFSET values, and the data is retrieved (step 706). If the retrieved cluster was not the last cluster to be read, then the logical cluster LC is incremented by one and the routine repeats by calculating a new LOGICAL_SECTOR value (step 705). If the retrieved cluster was the last cluster to be read, the routine ends.

Thus, a fast DOS file system has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus for assisting a user in navigating a vehicle, the apparatus comprising:
   a processor;
   a database including a data file, the data file including a plurality of data subsets having a logical sequence within the data file;
   a sensor subsystem coupled to the processor;
   an output subsystem coupled to the processor for outputting navigation information to the user;
   wherein the processor is configured to:
      compute a present location of the vehicle based on data from the sensor subsystem and the database; and
      cause the output subsystem to output an indication of the present location to the user; and
   wherein the processor is further configured to:
      determine the logical order of the data subsets within the data file from a first table, the first table including a plurality of references to the data subsets, wherein the plurality of references are arranged within the first table in a sequence different from the logical sequence of the data subsets within the data file; and
      store in consecutive locations of a second table the same plurality of references to the data subsets stored in the first table, according to the logical sequence of the data subsets within the data file.

2. An apparatus according to claim 1, wherein the database is a map database of streets in a geographic area.

3. An apparatus according to claim 2, wherein the data file includes information identifying a subset of the streets.

4. An apparatus according to claim 1, wherein the processor is further configured to store the plurality of references to the data subsets in consecutive locations of the second table according to the logical sequence of the data subsets within the data file, such that the relative position of each reference of the plurality of references within the second table represents the relative position of the corresponding data subset of the data file in the logical sequence.

5. An apparatus according to claim 1, wherein each of the data subsets is a data cluster, and wherein the processor is further configured to access the file by randomly accessing a location in the second table to retrieve at least one of the data clusters of the file.

6. An apparatus according to claim 5, wherein the processor is further configured to access the file by accessing a plurality of consecutive locations in the second table to retrieve the clusters of the file according to the logical order.

7. An apparatus according to claim 1, wherein the processor is further configured to automatically update the second table in response to the file being updated.

8. An apparatus according to claim 1, wherein the plurality of references are stored in the first table in the form of a linked list.

9. An apparatus according to claim 8, wherein the processor is further configured to read the plurality of references in the first table to identify the data subsets and to identify the logical sequence of the data subsets within the data file.

10. An apparatus for use in an automobile to assist a user in navigating, the apparatus comprising:
    means for storing a data file, the data file including a plurality of data subsets having a logical sequence within the data file;
    means for detecting movement of the automobile;
    means for computing route guidance information based on the detected movement of the automobile and the data file;
    means for determining the logical order of the data subsets within the data file from a first table, the first table including a plurality of references to the data subsets, wherein the plurality of references are arranged within the first table in a sequence different from the logical sequence of the data subsets within the data file;
    means for storing, in consecutive locations of a second table, the same plurality of references to the data subsets stored in the first table, according to the logical sequence of the data subsets within the data file; and
    means for outputting the route guidance information to the user.

11. An apparatus according to claim 10, wherein the means for storing the plurality of references comprises means for storing the plurality of references, such that the relative position of each reference of the plurality of references within the second table represents the relative position of the corresponding data subset of the data file in the logical sequence.

12. An apparatus according to claim 11, wherein each of the data subsets is a data cluster, the apparatus further comprising means for accessing the file by randomly accessing a location in the second table to retrieve at least one of the data clusters of the file.

13. An apparatus according to claim 11, wherein the plurality of references are stored in the first table in the form of a linked list.

14. An apparatus according to claim 11, further comprising means for reading the plurality of references in the first table to identify the data subsets and to identify the logical sequence of the data subsets within the data file.

15. An apparatus for assisting a user in navigating a vehicle, the apparatus comprising:

a processor;

a first storage region coupled to the processor and storing a database including a data file, the data file including a plurality of clusters of data;

a second storage region coupled to the processor and storing a file access table (FAT) having a plurality of locations, each location including a reference to one of the clusters of the data file and a reference to another location in the FAT indicating a next cluster of the data file, wherein the references to the clusters of the data file may be located in non-consecutive locations in the FAT;

a sensor subsystem coupled to the processor;

an output subsystem coupled to the processor;

wherein the processor is configured to:

identify, from the FAT, the logical order of the clusters within the data file;

construct a cluster table by storing the references to the clusters in consecutive locations of the cluster table based on the logical order;

access the data file by sequentially accessing the consecutive locations in the cluster table to retrieve the clusters of the data file;

compute route guidance information based on outputs of the sensor subsystem and the data file; and cause the output subsystem to output the route guidance information.

16. An apparatus according to claim 15, wherein the processor is further configured to automatically update the cluster table in response to an update to the data file.

17. An apparatus according to claim 15, wherein the references to the clusters are stored in the FAT as a linked list.

18. An apparatus according to claim 17, wherein the processor is configured to read the linked list to identify the logical order of the data clusters within the data file.

* * * * *